United States Patent Office 3,094,882
Patented June 25, 1963

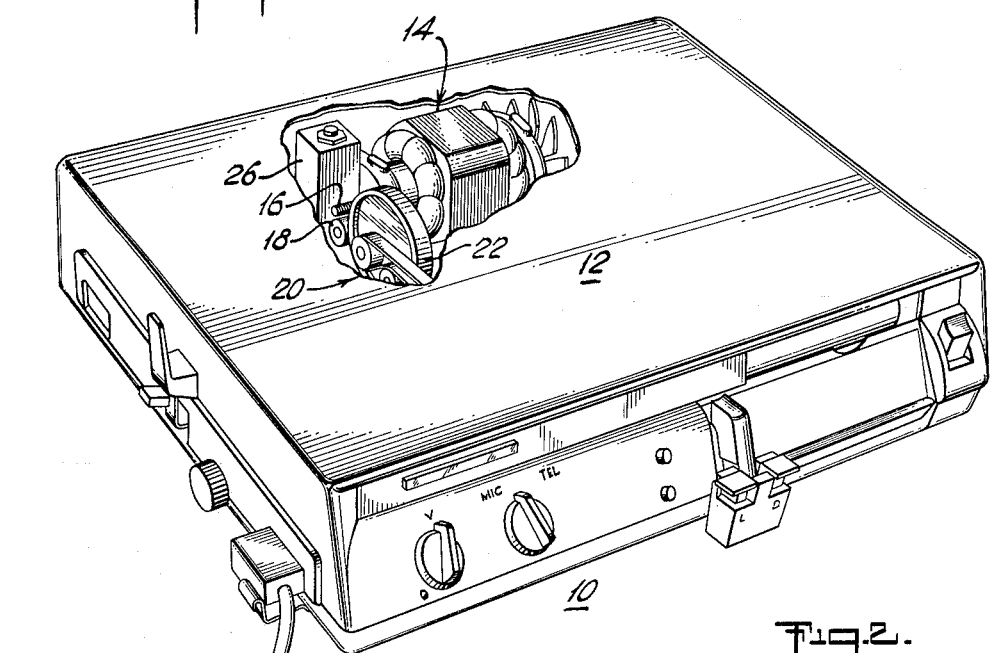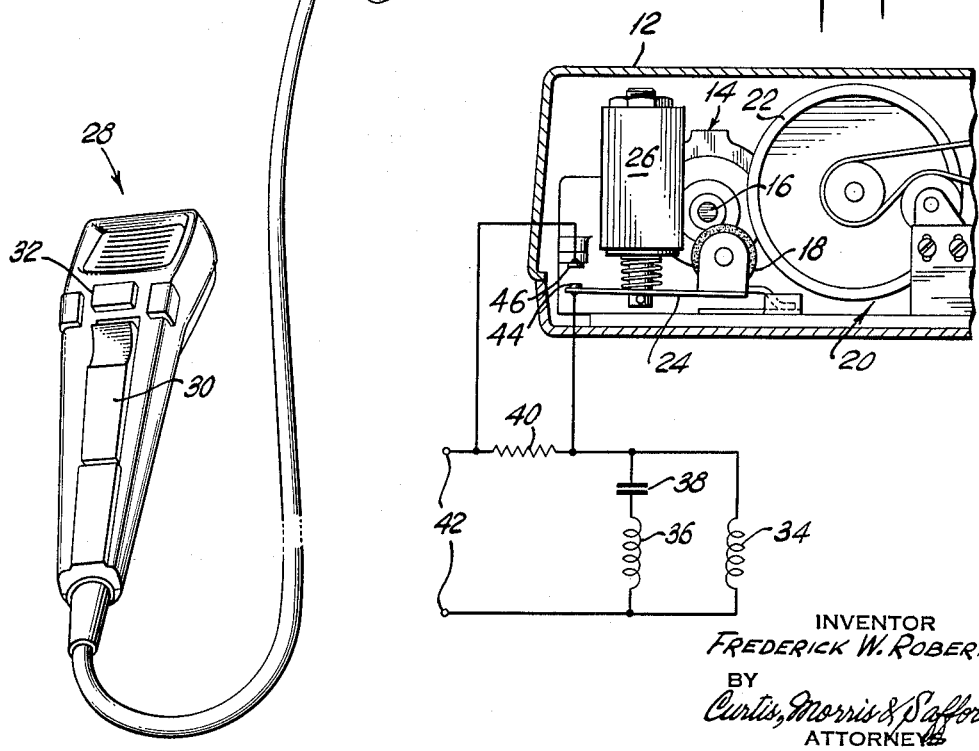

3,094,882
SYSTEM FOR OPERATING THE MOTOR IN A DICTATING MACHINE AND THE LIKE
Frederick W. Roberts, 230 Somerset Ave., Fairfield, Conn.
Filed Oct. 27, 1959, Ser. No. 849,108
3 Claims. (Cl. 74—472)

This invention relates to an arrangement for operating the electric motor in a dictating machine and the like to effectively eliminate motors noise and to provide more uniform motor speed.

In co-pending U.S. application Serial No. 497,011, now U.S. Patent 2,993,131, there is disclosed a very efficient and high quality small electric induction motor. Such a motor is particularly suited for use in a dictating machine like the one described and claimed in another co-pending application U.S. Serial No. 728,646, and now Patent No. 3,056,606. This motor is very rugged and compact and can be precision manufactured at low cost. Its electrical and mechanical efficiencies are so good that at no-load it runs at only a few revolutions per minute below synchronous speed. This fact however gives rise to several difficulties which the present invention is intended to overcome.

In even the best quality motor there is always some noise created by the varying magnetic forces acting on the rotating armature and other parts of the motor. This is intensified if there is any deviation from magnetic symmetry caused by uneven air gaps and other mechanical imperfections. Now in a high efficiency motor, such as mentioned above, where the air gap between rotor and stator is small (e.g. 0.005 in.) any variation in the uniformity of this gap produces a much higher variation in the forces which interact upon the parts of the motor. For a motor operated on 60 cycle per second power, the vibration due to these causes is primarily 120 cycles per second, though higher harmonics may also appear, and the ear is quite sensitive to these frequencies.

With a motor of the induction type, there is a tendency for the noise to vary inversely as a function of the slip frequency between exact synchronous speed and the operating speed of the motor. Thus, if this slip or difference frequency is low, for example 50 or 60 cycles per minute, the higher harmonics of the 60 cycle per second magnetic force-induced vibrations are beat modulated to a very audible maximum amplitude. When such a motor is mounted on the frame of a dictating machine, the latter acting as a sounding board produces a loud hum with a "wow-wow" intensity variation in it. This is disturbing to a person preparing to dictate into the machine. The present invention eliminates this difficulty.

A second problem encountered in using a high efficiency motor in a dictating machine as described above, is that the no-load and full-load speeds of the motor are substantially different. Now in a machine of this kind, when it is turned on but the operator is not dictating, the motor is on but is left un-clutched or disengaged from the record-driving mechanism. However, when the operator wishes to dictate he presses a friction drive or clutch control to connect the motor to this mechanism. Since this motor when un-clutched runs at a substantially higher speed than when under load, there will be an interval after the drive control is actuated during which the motor slows down to operating speed. The present invention provides an arrangement which not only minimizes the motor's beat-note noise, but also makes the no-load and full-load motor speeds substantially equal.

In accordance with the present invention in one specific embodiment thereof, a high efficiency induction motor in a dictating machine, when the machine is energized with power (i.e. "on") and the motor is running at no-load speed, is energized through a resistor instead of directly from the power line. This materially reduces the speed and correspondingly minimizes the noise from the motor. When the motor is drivingly connected to the record-driving mechanism this resistor is immediately shorted out through a switch operated by the drive means, so that full power is applied to the motor under load. The resistor is so proportioned that the full-load and no-load speeds of the motor are substantially equal.

A better understanding of the invention together with a fuller appreciation of its many advantages will best be gained from the following description given in connection with the accompanying drawings wherein:

FIGURE 1 is a perspective view, with parts broken away, of a dictating machine with a motor and control circuit embodying the invention; and FIGURE 2 is a schematic diagram of the electrical control circuit showing also mechanical parts of the motor and drive means.

The dictating machine 10 shown in FIGURE 1 includes a housing 12 within which is mounted a motor 14 having a construction substantially identical to the motor disclosed in U.S. application Serial No. 497,011 and which therefore will not be described further herein. Motor 14 has a drive shaft 16 extending above a movable rubber puck or idler roller 18 through which the motor is adapted to be connected to a record-driving mechanism generally indicated at 20 and including a wheel 22. Puck 18 as seen in figure is mounted on an arm 24 and is adapted to be drawn by a drive solenoid 26 into driving engagement with shaft 16 and wheel 22. The latter is energized and the drive means actuated, as seen in FIGURE 1, from a hand microphone unit 28 having a "record" switch 30 and a "playback" switch 32.

When the machine is on but the drive solenoid is not yet energized, motor 14 runs at no-load speed. Now, as seen in FIGURE 2, the two electrical windings of motor 14 are indicated by a coil 34 and a coil 36. The latter is in series with a capacitor 38 to shift the phase of current through it and thereby make the motor self-starting as is well known in the art. When solenoid 26 is not energized, both coils 34 and 36 are energized through a voltage dropping resistor 40 from a pair of terminals 42 to which are applied, when the machine is on, a suitable voltage (e.g. 117 v., 60 cycle). The presence of resistor 40 in series with coils 34 and 36 substantially reduces the no-load speed of motor 14 and thereby effectively eliminates motor beat-note noise as previously explained.

The outer end of arm 24 carries a switch contact 44 which when solenoid 26 is energized, moves up and closes against a contact 46 thereby immediately shorting resistor 40 out of circuit and applying the full voltage at terminals 42 to motor 14. The resistor 40 is proportioned so that at no-load the motor runs at substantially the same speed as when the resistor is shorted and the motor is running at full-load speed. Using the drive mechanism of the machine in this way to control the electrical operation as well as the mechanical actuation of the motor results in a simplified arrangement which nonetheless is highly reliable and effective.

A motor operated in accordance with the invention has a no-load speed at rated voltage of about 3550 r.p.m., giving a slip frequency below synchronous speed of 3600 r.p.m. of about 50 cycles per minute. The full-load speed is 3450 r.p.m. and resistor 40 is proportioned to make the actual no-load speed approximately the same.

I claim:
1. In a dictating machine and the like, a machine housing, a small high efficiency induction motor mounted in said housing to drive a record carrying mechanism therein, said motor having a normal no-load speed at rated voltage of nearly synchronous speed, drive means including an electric solenoid to drivingly engage said motor with said mechanism, said motor running under no-load when said drive means is disengaged, an electric circuit to energize said motor, an electric switch coupled to said solenoid, said switch being actuated when said drive means is engaged, and impedance means in said electric circuit and connected to be removed from circuit by said switch when said drive means is engaged, said impedance means when in circuit serving to reduce electric current to said motor at no-load and thereby eliminate audible motor beat-note noise.

2. An improved motor arrangement in a dictating machine and the like, said combination comprising a machine housing, a small high efficiency induction motor mounted in said housing and adapted to drive a record carrying mechanism therein, said motor having a normal no-load speed at rated voltage of nearly synchronous speed, drive means to drivingly engage said motor with said mechanism, said motor running under no-load when said drive means is disengaged, an electric circuit for energizing said motor, an electric switch, said switch being interconnected with said drive means and being closed when said drive means engages said motor with said mechanism, said switch being opened when said drive means disengages said motor from said mechanism, and impedance means in said electric circuit, said impedance means being shorted by said switch when closed, said impedance means serving to reduce electric current to said motor at no-load and thereby eliminate audible motor beat-note noise.

3. The arrangement as in claim 2 wherein said impedance comprises a resistor in series with said motor, said drive means including a solenoid, said electric switch comprising a pair of contacts controlled by said solenoid and which short out said resistor when said drive means is engaged.

References Cited in the file of this patent
UNITED STATES PATENTS

| | | |
|---|---|---|
| 2,211,985 | Peters | Aug. 20, 1940 |
| 2,484,712 | Jobst | Oct. 11, 1949 |
| 2,770,138 | Ripple | Nov. 13, 1956 |
| 2,924,986 | Hartman | Feb. 16, 1960 |